United States Patent
Hsiung

(10) Patent No.: US 10,312,808 B2
(45) Date of Patent: Jun. 4, 2019

(54) POWER SUPPLY AND POWER CONTROL METHOD THEREOF

(71) Applicant: GETAC TECHNOLOGY CORPORATION, Hsinchu County (TW)

(72) Inventor: Ta-Sung Hsiung, Taoyuan (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 113 days.

(21) Appl. No.: 14/932,845

(22) Filed: Nov. 4, 2015

(65) Prior Publication Data
US 2017/0126123 A1    May 4, 2017

(51) Int. Cl.
H02M 3/156 (2006.01)
H02M 3/158 (2006.01)
H02J 7/00 (2006.01)

(52) U.S. Cl.
CPC .............. *H02M 3/158* (2013.01); *H02J 7/00* (2013.01)

(58) Field of Classification Search
CPC ........ H02M 3/10; H02M 3/145; H02M 3/155; H02M 3/156; H02M 3/1563; H02M 3/157; H02M 3/158; H02M 3/1582; H02M 3/1584; H02M 3/1588; H02M 1/08; H02M 1/32; H02M 2001/0009; H02M 2001/0032; H02M 2001/0035; H02M 2001/0025; H02M 2003/1552; H02M 2003/1555; H02J 7/00
USPC ........ 323/222–226, 266, 268–278, 282–286, 323/298, 299–303, 351; 363/123–130; 713/300–340; 320/124, 125, 127–136, 320/140–145, 149, 155–159, 161–165
See application file for complete search history.

(56) References Cited

U.S. PATENT DOCUMENTS

| | | | | |
|---|---|---|---|---|
| 5,254,951 | A * | 10/1993 | Goto | G01R 31/3606 320/134 |
| 5,477,128 | A * | 12/1995 | Iizuka | H02J 7/0072 320/163 |
| 5,963,015 | A * | 10/1999 | Lee | H02J 7/0068 320/128 |
| 6,229,286 | B1 * | 5/2001 | Tokuyama | H02J 7/0068 320/132 |
| 8,299,765 | B2 * | 10/2012 | Hirano | H02M 1/36 323/224 |

(Continued)

FOREIGN PATENT DOCUMENTS

CN    104331141 A    2/2015
CN    104362852 A    2/2015

*Primary Examiner* — Gary L Laxton
*Assistant Examiner* — Carlos O Rivera-Perez

(57) ABSTRACT

A power supply and a power control method thereof are provided. The power supply is adapted to be coupled to a load. The power supply includes a battery, an amplifying circuit, and a control circuit. The amplifying circuit receives a load voltage from an output end of the power supply. The amplifying circuit receives a battery voltage from an output end of the battery. When the load is coupled to the output end of the power supply, the amplifying circuit provides a first output voltage according to a voltage difference between the load voltage and the battery voltage. The control circuit controls the battery according to the first output voltage in providing a second output voltage, such that the load is charged at the second output voltage.

9 Claims, 4 Drawing Sheets

(56) References Cited

U.S. PATENT DOCUMENTS

| | | | |
|---|---|---|---|
| 2011/0012565 A1* | 1/2011 | Lee | H02J 7/0073 |
| | | | 320/163 |
| 2011/0128153 A1* | 6/2011 | Sims | G06F 1/3203 |
| | | | 340/636.1 |
| 2013/0325303 A1* | 12/2013 | Kiuchi | G01R 31/3624 |
| | | | 701/112 |

* cited by examiner ured the POWER SUPPLY AND POWER CONTROL
METHOD THEREOF

BACKGROUND OF THE INVENTION

Field of the Invention

The present invention relates to a power supply and a power control method thereof and more particularly to a power supply equipped with a battery and a power control method thereof.

Description of the Prior Art

Due to technological advances, electronic devices, such as smartphones, tablets, and palm-held game consoles, are gradually becoming daily necessities. To meet consumer needs, manufactures keep launching novel, widescreen and high-performance electronic devices. However, hand-held electronic devices are usually designed to meet downsizing requirements and thus are disadvantaged by limited battery capacity; as a result, users have to purchase a power supply, such as a power bank, to supplement the power supplied to the electronic devices. To meet the ever-increasing consumer needs, power banks with specifications variable in terms of high capacity and quick charge are increasingly common in the market In general, a power bank usually has a power input end, a power output end and a discharge switch (such as a button device). The users connect a utility electrical power supply or any power supply device to the power input end to therefore charge a battery in the power bank automatically. By contrast, to transfer power from the battery in the power bank to a load (such as the aforesaid electronic device), the users not only connect the load to charge and the power output end of the power bank but also operate the discharge switch in order to charge the load with the power bank. Accordingly, it is necessary to provide a power control method conducive to enhancement of ease of use so as to streamline the process of charging the load with a power supply.

SUMMARY OF THE INVENTION

The present invention provides a power supply and a power control method thereof. The power supply charges the load automatically in response to a load being inserted into the power supply.

The power supply of the present invention is adapted to be coupled to the load. The power supply comprises a battery, an amplifying circuit and a control circuit. The battery has an output end. The amplifying circuit has a first input end, a second input end and an output end. The first input end is coupled to the output end of the power supply. The second input end is coupled to the output end of the battery. When the load is coupled to the output end of the power supply, the amplifying circuit generates a first output voltage according to the voltage difference between the first input end and the second input end. The control circuit is coupled to a battery and an amplifying circuit and adapted to control the battery in providing a second output voltage according to first output voltage, such that the load is charged at the second output voltage.

In an embodiment of the present invention, the control circuit determines whether the first output voltage is larger than a voltage threshold. If the first output voltage is larger than the voltage threshold, the control circuit controls the battery in providing the second output voltage. If the first output voltage is not larger than the voltage threshold, the control circuit stops the battery from providing the second output voltage.

In an embodiment of the present invention, when the output end of the power supply is coupled to the load, the voltage difference increases in response to the connection of the load, and the first output voltage increases with the voltage difference.

In an embodiment of the present invention, when the output end of the power supply is not coupled to the load, the voltage difference equals zero.

In an embodiment of the present invention, the power supply further comprises a first resistor and a diode. The first resistor is coupled between the output end of the battery and the first input end of the amplifying circuit to effectuate voltage division together with the load when the load is coupled to the output end of the power supply, wherein the first resistor is an adjustable resistor. The diode is coupled between the output end of the power supply and the first input end of the amplifying circuit to prevent reversal of the second output voltage.

In an embodiment of the present invention, the power supply further comprises a voltage-regulating circuit. The voltage-regulating circuit is coupled between the control circuit and the output end of the power supply to adjust the second output voltage and further comprises a voltage regulator and a capacitor network. The voltage regulator is coupled to the control circuit. The capacitor network has first capacitors connected in parallel and coupled between the voltage regulator and the output end of the power supply.

In an embodiment of the present invention, the amplifying circuit comprises a differential amplifier, a second resistor, a third resistor, a fourth resistor, a fifth resistor and a fourth capacitor. The differential amplifier has a first input end, a second input end and an output end, with the output end adapted to provide a first output voltage. The second resistor is coupled between the first input end of the amplifying circuit and the first input end of the differential amplifier. The third resistor is coupled between the second input end of the amplifying circuit and the second input end of the differential amplifier. The fourth resistor is coupled between the first input end and the output end of the differential amplifier. The fifth resistor is coupled between a ground voltage and the second input end of the differential amplifier. The fourth capacitor is coupled between the first input end and second input end of the differential amplifier.

In an embodiment of the present invention, the control circuit comprises a first inductor, a control unit, a first transistor and a second transistor. The first inductor is coupled to the output end of the battery. The control unit has an input end, a first output end and a second output end. The input end of the control unit is coupled to the output end of the amplifying circuit and adapted to receive the first output voltage. The first output end of the control unit provides a first control signal according to the first output voltage. The second output end of the control unit provides a second control signal according to the first output voltage. The first transistor has a first end, a second end and a control end, with the first end coupled to the first inductor, and the second end coupled to the ground voltage. The control end of the first transistor receives the first control signal. The first transistor turns on and turns off according to the first control signal. The second transistor has a first end, a second end and a control end, with the first end coupled to the first inductor, and the second end coupled to the voltage regulator. The control end of the second transistor receives the second control signal. The second transistor turns on and turns off according to the second control signal.

In an embodiment of the present invention, if the first output voltage is larger than a voltage threshold, the control unit provides the first control signal whereby the first transistor switches between an off state and an on state and provides the second control signal whereby the second transistor switches between an on state and an off state. If the first output voltage is not larger than the voltage threshold, the control unit provides the first control signal for driving the first transistor to turn off and provides the second control signal for driving the second transistor to turn off.

In an embodiment of the present invention, the battery voltage generated from the battery is boosted to the second output voltage under the control of the control unit.

The present invention further provides a power control method adapted for use with a power supply equipped with a battery. The control method comprises the steps of: receiving a load voltage from the output end of the power supply; receiving a battery voltage from the output end of a battery; providing a first output voltage according to the voltage difference between the load voltage and the battery voltage when the load is coupled to the output end of the power supply; and controlling the battery in providing a second output voltage according to first output voltage, such that the load is charged at the second output voltage.

In an embodiment of the present invention, the step of controlling the battery in providing the second output voltage according to the first output voltage to allow the load to be charged at the second output voltage further comprises: determining whether the first output voltage is larger than a voltage threshold; controlling the battery in providing the second output voltage if the first output voltage is larger than the voltage threshold; and stopping the battery from providing the second output voltage if the first output voltage is not larger than the voltage threshold.

In an embodiment of the present invention, when the output end of the power supply is coupled to the load, the voltage difference increases in response to the connection of the load, and the first output voltage increases with the voltage difference.

In an embodiment of the present invention, the power control method further comprises the step of setting the voltage difference to zero when the output end of the power supply is not coupled to the load.

In an embodiment of the present invention, if the first output voltage is larger than the voltage threshold, the step of controlling the battery in providing the second output voltage further comprises boosting the battery voltage generated from the battery to the second output voltage.

The present invention provides a power supply and a power control method thereof, characterized in that: determining whether a load is inserted, by detecting a voltage difference between a first input end and a second input end of the power supply; and supplying power according to the voltage difference so as to charge the load. Hence, the present invention dispenses with a discharge switch of a conventional power supply and thus enhances the ease of charging the load.

To render the aforesaid technical features and advantages of the present invention obvious and comprehensible, the present invention is illustrated with embodiments, depicted with the accompanying drawing, and described below.

BRIEF DESCRIPTION OF THE DRAWINGS

FIG. 2-1 is a circuit diagram of the power supply according to an embodiment of the present invention;

FIG. 2-2 is a circuit diagram of a power supply according to another embodiment of the present invention.

DETAILED DESCRIPTION OF THE EMBODIMENTS

Figure 1:
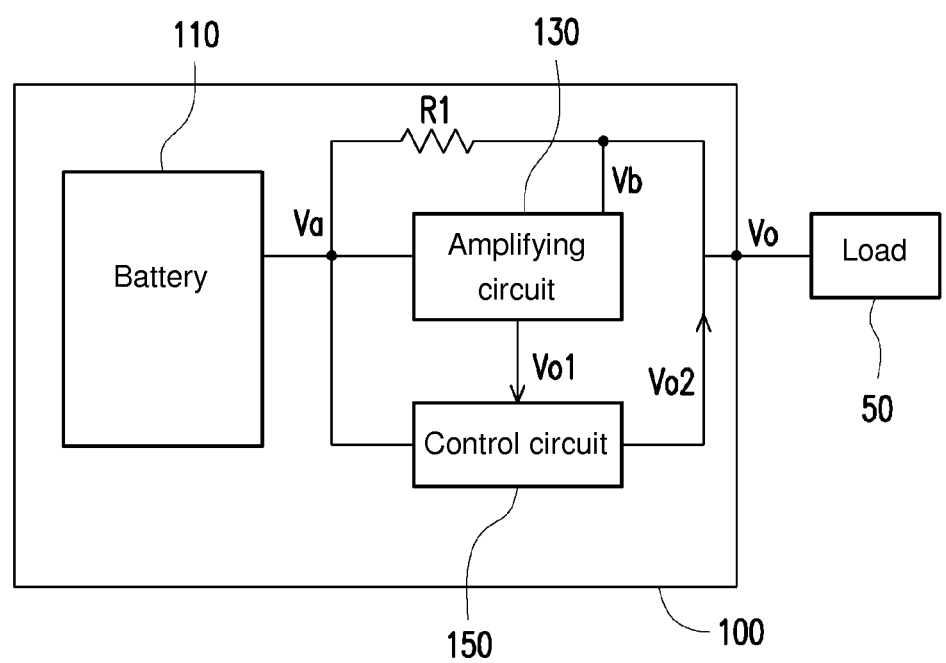
FIG. 1 is a circuit block diagram of a power supply according to an embodiment of the present invention.

FIG. 1 is a circuit block diagram of a power supply 100 according to an embodiment of the present invention. Referring to FIG. 1, the power supply 100 comprises a battery 110, an amplifying circuit 130 and a control circuit 150. The power supply 100 is a power bank or a movable or stationary power supply device of any type.

The battery 110 is illustrative of a single battery (or battery component), a battery combination, or a module which comprises one or more batteries (or battery components). Furthermore, the battery 110 is a nickel-zinc battery, nickel-hydrogen battery, lithium-ion battery, lithium-polymer battery or phosphate-, lithium- or ferric-rechargeable battery, but the present invention is not limited thereto. The battery 110 has an output end for generating a battery voltage Va.

The amplifying circuit 130 has a first input end, a second input end and an output end. The first input end of the amplifying circuit 130 is coupled to the output end Vo of the power supply 100. The second input end of the amplifying circuit 130 is coupled to the output end of the battery 110. The resistor R1 is coupled between the output end of the battery 110 and the first input end of the amplifying circuit 130. When a load 50 is coupled to the output end Vo of the power supply 100, the amplifying circuit 130 provides an output voltage Vo1 according to the voltage difference between the first input end and the second input end.

For instance, the output end Vo of the power supply 100 supports interfaces of power output provided by various specifications, such as Universal Serial Bus (USB) or lightning, which are not restrictive of the embodiments of the present invention.

The control circuit 150 is coupled to the battery 110 and the amplifying circuit 130 to control the output of the battery 110 according to the output voltage Vo1, so as to generate an output voltage Vo2 and allow the load 50 to be charged at the output voltage Vo2. The output voltage Vo2 conforms with the interface specification (such as 3.3V and 5V) of the output end Vo.

The load 50 is an electronic device, such as a smartphone, a tablet or a camera, which is not restrictive of the embodiments of the present invention.

In an embodiment, the control circuit 150 determines whether the output voltage Vo1 is larger than a voltage threshold. If the output voltage Vo1 is larger than the voltage threshold, the control circuit 150 controls the battery 110 in providing the output voltage Vo2. If the output voltage Vo1 is not larger than the voltage threshold, the control circuit 150 controls the output of the battery 110 so as to stop providing the output voltage Vo2.

In an embodiment, when the output end Vo of the power supply 100 is coupled to the load 50, the voltage difference (i.e., the voltage difference of the resistor R1) between the first input end and the second input end of the amplifying circuit 130 increases in response to the connection of the load 50, and the output voltage Vo1 increases with the voltage difference.

In another embodiment, when the output end Vo of the power supply 100 is not coupled to the load 50, the voltage difference between the first input end and the second input end of the amplifying circuit 130 is zero.

Hence, when the load 50 is not coupled to the output end Vo of the power supply 100, the voltage difference is zero, and in consequence the output voltage Vo1 also equals zero or any other default low voltage level, such as 0.2V or 0.5V. After receiving the output voltage Vo1, the control circuit 150 determines that the output voltage Vo1 is not larger than the voltage threshold and stops the battery 110 from providing the output voltage Vo2.

When the load 50 is coupled to the output end Vo of the power supply 100, there is a voltage difference between the output end Vo of the power supply 100 and the output end of the battery 110. The amplifying circuit 130 provides the output voltage Vo1 in response to an increase in the voltage difference to thereby allow the control circuit 150 to detect that the output voltage Vo1 is larger than the voltage threshold. Afterward, the control circuit 150 controls the battery 110 in providing the output voltage Vo2, such that the load 50 coupled to the output end Vo of the power supply 100 is charged at the output voltage Vo2.

In the embodiments of the present invention, detection of a voltage variation arising from the insertion of the load 50 into the output end Vo of the power supply 100 not only facilitates automatic detection of a need for external charge but also enables the output voltage Vo2 to be provided accordingly. The power supply 100 is hereunder described and illustrated with an embodiment of the present invention.

Figures 1, 2:
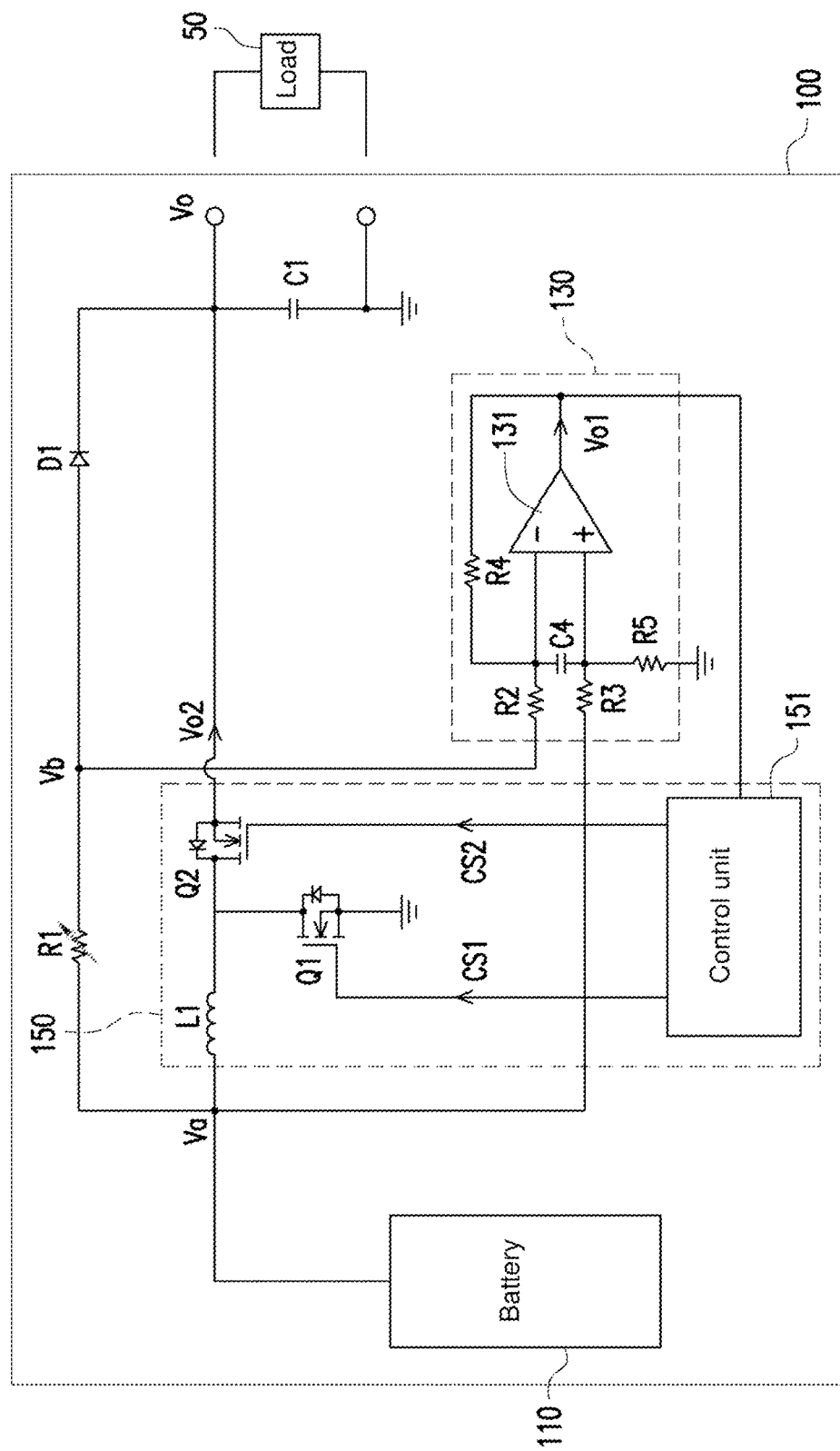
Figure 2:
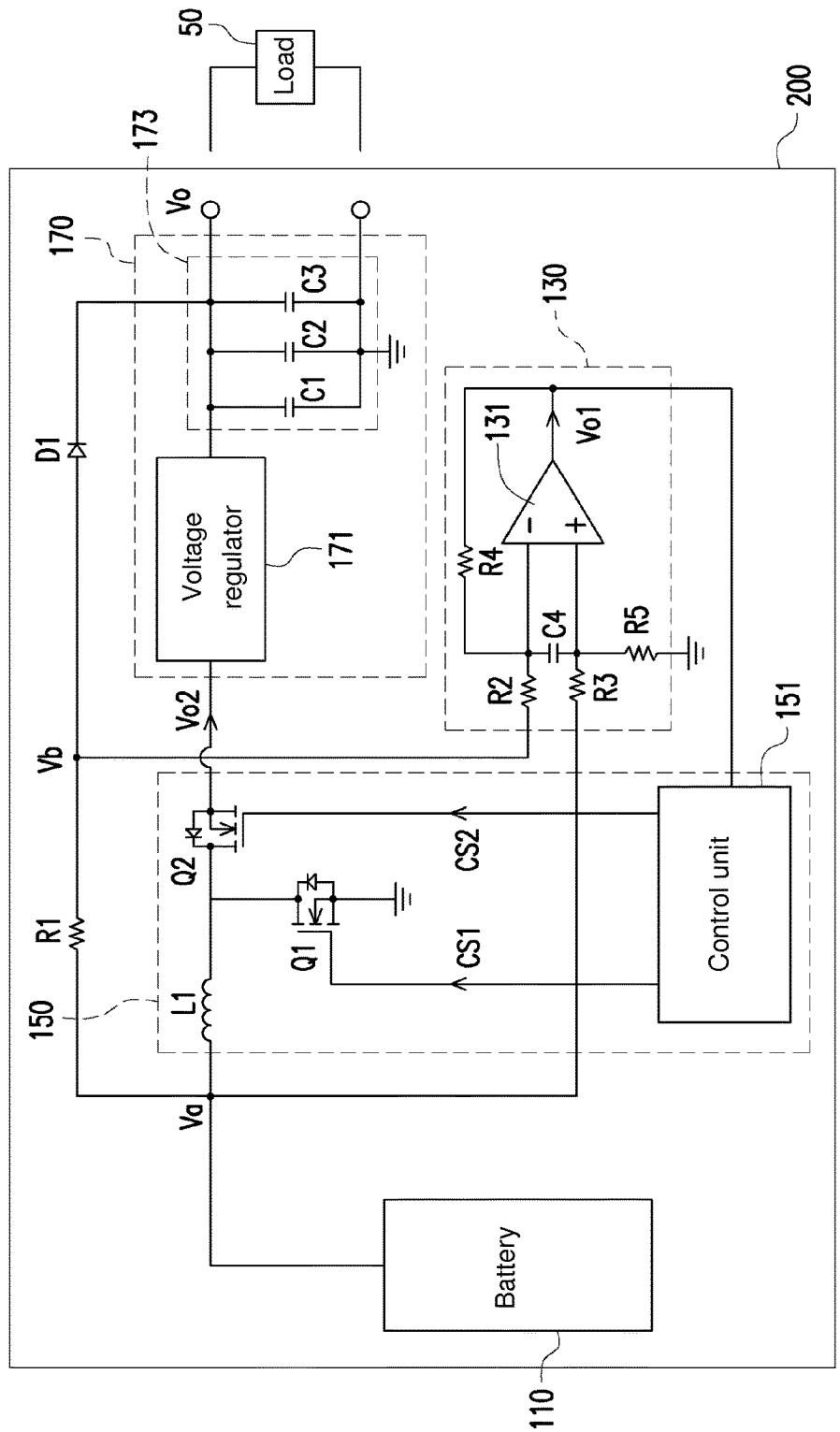

FIG. 2-1 is a circuit diagram of the power supply 100 according to an embodiment of the present invention. Referring to FIG. 1 and FIG. 2-1, like or similar components are denoted with like or similar reference numerals and signs. In this embodiment, the power supply 100 comprises a resistor R1 and a diode D1. The resistor R1 is coupled between the output end of the battery 110 and the first input end of the amplifying circuit 130 to effectuate voltage division together with the load 50 when the load 50 is coupled to the output end Vo of the power supply 100.

When the load 50 is not coupled to the output end Vo of the power supply 100, the battery 110, the resistor R1, the diode D1 and the output end Vo of the power supply 100 together form an open circuit, and the battery voltage Va equals the load voltage Vb (i.e., the voltage at the output end Vo of the power supply 100.) The voltage difference between the battery voltage Va and the load voltage Vb equals zero such that the amplifying circuit 130 is not operating, wherein the control circuit 150 detects that the output voltage Vo1 equals zero. By contrast, when the load 50 is coupled to the output end Vo of the power supply 100, the load voltage Vb is affected by a variation (for example, a decrease) in the impedance of the load 50 coupled to the output end Vo of the power supply 100. Hence, the battery voltage Va and the load voltage Vb satisfy equation (1):

$$Vb=Va*(RL/(R1+RL)) \quad (1)$$

where RL denotes the impedance of the load 50, and, presumably, equation (1) ignores the voltage of the diode D1.

The resistor R1 is an adjustable resistor. In the embodiments of the present invention, the resistance of the resistor R1 can be adjusted as needed. For example, the impedance RL of the load 50 equals 15 kΩ, and the resistance of the resistor R1 also equals 15 kΩ. The diode D1 is coupled between the output end Vo of the power supply 100 and the first input end of the amplifying circuit 130 to prevent current reversal of the output voltage Vo2. For example, the battery voltage Va of the battery equals 3V, and the output voltage Vo2 equals 5V. The cathode of the diode D1 is coupled to the output end Vo of the power supply 100 to prevent current from flowing back to the battery 110, because the diode D1 allows an electric current to pass in the diode's forward direction but blocks the electric current in the diode's backward direction.

Depending on design requirements, when the load 50 is not coupled to the output end Vo of the power supply 100, both the voltage difference and the output voltage Vo1 may be of any voltage level other than zero (for example, given a voltage threshold of 5V, the voltage difference between the battery voltage Va and the load voltage Vb is 1 V, and the output voltage Vo1 is 3V, when the load 50 is not coupled to the output end Vo of the power supply 100,) provided that the output voltage Vo1 is not larger than the voltage threshold, but the embodiments of the present invention are not limited thereto.

The amplifying circuit 130 comprises a differential amplifier 131, a resistor R2, a resistor R3, a resistor R4, a resistor R5 and a capacitor C4. The differential amplifier 131 has a first input end, a second input end and an output end. The output voltage Vo1 is generated from the output end of the differential amplifier 131. The resistor R2 is coupled between the first input end (which receives the load voltage Vb) of the amplifying circuit 130 and the first input end of the differential amplifier 131. The resistor R3 is coupled between the second input end (which receives battery voltage Va) of the amplifying circuit 130 and the second input end of the differential amplifier 131. The resistor R4 is coupled between the first input end and the output end of the differential amplifier 131. The resistor R5 is coupled between a ground voltage and the second input end of the differential amplifier 131. The capacitor C4 is coupled between the first input end and the second input end of the differential amplifier 131. The output voltage Vo1 is generated from the output end of the differential amplifier 131.

Given the circuit layout shown in FIG. 2-1, the output voltage Vo1 provided by the amplifying circuit 130 satisfies equation (2):

$$Vo1=((R2+R4)/R2)(R5/(R3+R5))*Va-(R4|R2)*Vb \quad (2)$$

For example, assuming that the resistor R2 equals the resistor R3 in resistance, and the resistor R4 equals the resistor R5 in resistance, the substitution of equation (2) brings about equation (3).

$$Vo1=(R4|R2)*(Va-Vb) \quad (3)$$

As indicated by equation (3), when the load 50 is not coupled to the output end Vo of the power supply 100, the battery voltage Va equals the load voltage Vb, whereas the output voltage Vo1 equals zero. Afterward, equation (1) is substituted into equation (3) as follows:

$$Vo1=(R4|R2)*Va*(RL/(R1+RL)) \quad (4)$$

When the load 50 is coupled to the output end Vo of the power supply 100, the load 50 and the resistor R1 together effectuate voltage division, wherein the battery voltage Va does not equal the load voltage Vb, and thus the output voltage Vo1 does not equal zero according to equations (3), (4).

Depending on design requirements, by adjusting the impedance of the resistor R2 and resistor R4, it is feasible to obtain the output voltage Vo1 which meets the design requirements, such that the amplifying circuit 130 provides the output voltage Vo1 to the control circuit 150.

The control circuit 130 comprises an inductor L1, a control unit 151, a transistor Q1 and a transistor Q2. The inductor L1 is coupled to the output end of the battery 110. The control unit 151 has an input end, a first output end and a second output end. For example, the control unit 151 is a component, unit or module, which is capable of control, and the control unit 151 is exemplified by a micro control unit (MCU), an integrated circuit (IC), and a chipset. The first input end of the control unit 151 is coupled to the output end of the amplifying circuit 130 and adapted to receive the output voltage Vo1. The first output end of the control unit 151 provides a control signal CS1 according to the output voltage Vo1. The second output end of the control unit 151 provides a control signal CS2 according to the output voltage Vo1.

The transistor Q1 has a first end, a second end and a control end. The first end of the transistor Q1 is coupled to the inductor L1. The second end of the transistor Q1 is coupled to the ground voltage. The control end of the transistor Q1 receives the control signal CS1. The transistor Q1 turns on and turns off according to the control signal CS1. The transistor Q2 has a first end, a second end and a control end. The first end of the transistor Q2 is coupled to the inductor L1. The second end of the transistor Q2 is coupled to the output end Vo of the power supply 100. The control end of the transistor Q2 receives the control signal CS2. The transistor Q2 turns on and turns off according to the control signal CS2.

The transistors Q1, Q2 are N-type power MOSFET transistors, but the present invention is not limited thereto. The first ends and second ends of the transistors Q1, Q2 are drains and sources, respectively. The control ends of the transistors Q1, Q2 are gates. The cathodes and anodes of body diodes of the transistors Q1, Q2 are coupled between the first ends and second ends of the transistors Q1, Q2.

In this embodiment, if the output voltage Vo1 is larger than the voltage threshold, the control unit 151 provides the control signal CS1 whereby the transistor Q1 switches between its off state and on state and provides the control signal CS2 whereby the transistor Q2 switches between its on state and off state. If the output voltage Vo1 is not larger than the voltage threshold, the control unit 151 provides the control signal CS1 to cause the transistor Q1 to turn off and provides the control signal CS2 to cause the transistor Q2 to turn off.

When the load 50 is not coupled to the output end Vo of the power supply 100, the output voltage Vo1 is not larger than the voltage threshold, and thus both the transistor Q1 and transistor Q2 turn off. By contrast, when the load 50 is coupled to the output end Vo of the power supply 100, the output voltage Vo1 is larger than the voltage threshold, and thus the transistors Q1, Q2 switch between the on state and the off state. When the transistor Q1 turns on and the transistor Q2 turns off, the inductor L1 stores energy. By contrast, when the transistor Q1 turns off and the transistor Q2 turns on, the energy of the inductor L1 is transferred to the output end Vo of the power supply 100 because the transistor Q2 turns on. The output end Vo of the power supply 100 is parallel-connected to the capacitor C1 grounded, wherein the capacitor C1 filters out high-frequency signals, thereby stabilizing the output voltage Vo2.

The control unit 151 has an enable pin, for example. The enable pin is coupled to the output end of the amplifying circuit 130. When the output voltage Vo1 is larger than the voltage threshold, the enable pin is triggered, such that the control unit 151 generates and sends the control signal CS1 for driving the transistor Q1 to turn off and turn on and the control signal CS2 for driving the transistor Q2 to turn on and turn off. By contrast, when the output voltage Vo1 is not larger than the voltage threshold, the enable pin is not triggered, such that the control unit 151 generates and sends the control signal CS1 for driving the transistor Q1 to turn off and the control signal CS2 for driving the transistor Q2 to turn off.

Depending on design requirements, the control circuit 150 is integrated to form an analog or digital chip or module, but the present invention is not limited thereto.

To maintain the stability of the power supply 100, the present invention further provides a preferred embodiment. FIG. 2-2 is a circuit diagram of a power supply 200 according to another embodiment of the present invention. The difference between the power supply 200 of FIG. 2-2 and the power supply 100 of FIG. 2-1 is that the power supply 200 further comprises a voltage-regulating circuit 170. The voltage-regulating circuit 170 is coupled between the output end Vo of the power supply 200 and the control circuit 150 to adjust the output voltage Vo2. In this embodiment, the voltage-regulating circuit 170 comprises a voltage regulator 171 and a capacitor network 173. The voltage regulator 171 is coupled to the control circuit 150. For example, the voltage-regulating circuit 170 adjusts the output voltage Vo2 according to voltage level requirements, such as 5V or 3V, such that the output voltage Vo2 attains the required voltage level. The capacitor network 173 has capacitors C1, C2, C3 connected in parallel, grounded, and coupled between the voltage regulator 171 and the output end Vo of the power supply 200. The capacitor network 173 performs noise filtering and rectification on the output voltage Vo2 to thereby allow the power supply 100 to provide the stable output voltage Vo2.

Depending on design requirements, the quantity and arrangement of the capacitors in the capacitor network 173 is subject to changes. For example, in a variant embodiment of the present invention, it is practicable to connect two or five capacitors in parallel or connect two capacitors in series. The capacitor network 173 can also be integrated with a resistor to form a resistor capacitor network. Furthermore, the voltage-regulating circuit 170 is integrated to form an analog or digital chip or module, but the present invention is not limited thereto.

Figure 3:
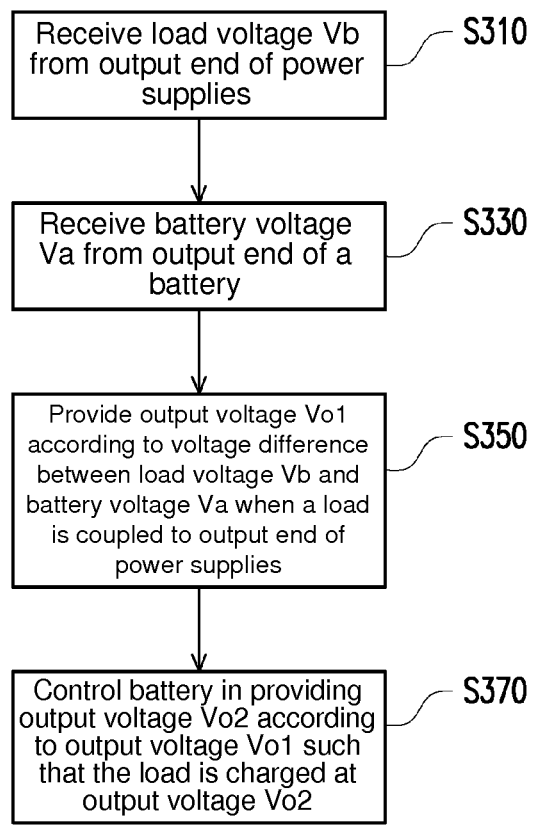
FIG. 3 is a flowchart of a power control method of the power supplies according to an embodiment of the present invention.

FIG. 3 is a flowchart of a power control method of the power supplies 100, 200 according to an embodiment of the present invention. Referring to FIG. 3, the power control method applies to the power supply 100 shown in FIG. 1 and FIG. 2-1 and the power supply 200 shown in FIG. 2-2. The power control method in this embodiment of the present invention is hereunder described with reference to the components or modules of the power supplies 100, 200. The steps of the process flow of this method can be adjusted as needed, but the present invention is not limited thereto. In step S310, the amplifying circuit 130 receives the load voltage Vb from the output end Vo of the power supplies 100, 200. In step S330, the amplifying circuit 130 receives the battery voltage Va from the output end of the battery 110. In step S350, when the load 50 is coupled to the output end Vo of the power supplies 100, 200, the amplifying circuit 130 provides the output voltage Vo1 according to the voltage difference between the load voltage Vb and the battery voltage Va. In step S370, the control circuit 150 controls the battery 110 in providing the output voltage Vo2 according to the output voltage Vo1, such that the load 50 is charged at the output voltage Vo2. The details of the aforesaid steps are not further explained below, because they are already illustrated with FIG. 1, FIG. 2-1, FIG. 2-2, and their respective embodiments.

In conclusion, the present invention provides a power supply and a power control method thereof, characterized in that: an amplifying circuit receives a load voltage and a battery voltage and provides different output voltages according to the voltage difference between the load voltage and the battery voltage; and the control circuit determines whether the load is connected to the power supply according to the magnitude of the output voltages and controls a battery in providing an output voltage to the load so as to charge the load accordingly. Hence, in an embodiment of the present invention, the power supply automatically detects whether an electronic device to be charged is connected or not and then automatically supplies the required power after the electronic device has got connected, thereby dispensing with the hassles of starting the aforesaid charging process by hand. Therefore, the present invention not only cuts the material costs otherwise incurred in manufacturing a discharge switch, such as a button device, but also enables the power supply to look neat and simple.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A power supply, of which a ground and an output end are adapted to be coupled to a load, comprising:
   a battery having an output end;
   a first resistor coupled between the output end of the battery and the output end of the power supply so as to effectuate voltage division together with the load when the load is coupled to the ground and the output end of the power supply;
   an amplifying circuit having a first input end, a second input end and an output end, with the first input end coupled to a first node between the first resistor and the output end of the power supply, and the second input end coupled to a second node between the first resistor and the output end of the battery, wherein when the load is coupled to the ground and the output end of the power supply, the amplifying circuit generates a first output voltage according to a voltage difference between the first node and the second node; and
   a control circuit coupled in parallel with the first resistor between the output end of the battery and the output end of the power supply and outputting a second output voltage according to the first output voltage, such that the load is charged at the second output voltage, wherein the control circuit comprises:
      a first inductor coupled to the output end of the battery;
      a control unit having an input end, a first output end and a second output end, wherein the input end of the control unit is coupled to the output end of the amplifying circuit and adapted to receive the first output voltage, wherein a first control signal is generated from the first output end of the control unit according to the first output voltage, and a second control signal is generated from the second output end of the control unit according to the first output voltage;
      a first transistor having a first end, a second end and a control end, with the first end coupled to the first inductor, the second end coupled to the ground voltage, and the control end adapted to receive the first control signal, thereby allowing the first transistor to turn on and turn off according to the first control signal; and
      a second transistor having a first end, a second end and a control end, with the first end coupled to the first inductor, the second end coupled to a voltage regulator, and the control end adapted to receive the second control signal, thereby allowing the second transistor to turn on and turn off according to the second control signal;
      wherein when the first output voltage is larger than a voltage threshold, the control unit generates and sends the first control signal for driving the first transistor to turn off and turn on and sends the second control signal for driving the second transistor to turn on and turn off, and when the first output voltage is not larger than the voltage threshold, the control unit generates and sends the first control signal for driving the first transistor to turn off and the second control signal for driving the second transistor to turn off; and
   wherein when the load is not coupled to the ground and the output end of the power supply, the voltage difference is not larger than the voltage threshold; and
   wherein when the load is coupled to the ground and the output end of the power supply, the voltage difference is larger than the voltage threshold, and when the first transistor turns on and the second transistor turns off, the first inductor stores energy, and when the first transistor turns off and the second transistor turns on, the energy of the first inductor is transferred to the output end of the power supply.

2. The power supply of claim 1, wherein, when the output end of the power supply is coupled to the load, the voltage difference increases in response to the connection of the load, and the first output voltage increases with the voltage difference.

3. The power supply of claim 1, wherein power supply further comprises:
   a diode coupled between the output end of the power supply and the first input end of the amplifying circuit to prevent reversal of the second output voltage.

4. The power supply of claim 3, wherein power supply further comprises: a voltage-regulating circuit coupled between the control circuit and the output end of the power supply to adjust the second output voltage, wherein the voltage-regulating circuit comprises: the voltage regulator coupled to the control circuit; and a capacitor network having a plurality of first capacitors connected in parallel and coupled between the voltage regulator and the output end of the power supply.

5. The power supply of claim 3, wherein the amplifying circuit comprises:
   a differential amplifier having a first input end, a second input end and an output end, wherein the output end provides the first output voltage;
   a second resistor coupled between the first input end of the amplifying circuit and the first input end of the differential amplifier;
   a third resistor coupled between the second input end of the amplifying circuit and the second input end of the differential amplifier;
   a fourth resistor coupled between the first input end and the output end of the differential amplifier;

a fifth resistor coupled between a ground voltage and the second input end of the differential amplifier; and a fourth capacitor coupled between the first input end and the second input end of the differential amplifier.

6. The power supply of claim 1, wherein a battery voltage generated from the battery is boosted to the second output voltage by the control unit.

7. The power supply of claim 1, wherein the first resistor is an adjustable resistor.

8. The power supply of claim 1, arranged such that the first output voltage is output according to the equation $Vb=Va*(RL/(R1+RL))$, where Va is the voltage at the second node, Vb is the voltage at the first node, R1 is the resistance of first resistor, and RL is the impedance of the load.

9. The power supply of claim 1, wherein the control circuit is directly connected between the battery and the output end of the power supply.

\* \* \* \* \*